Patented Feb. 7, 1950

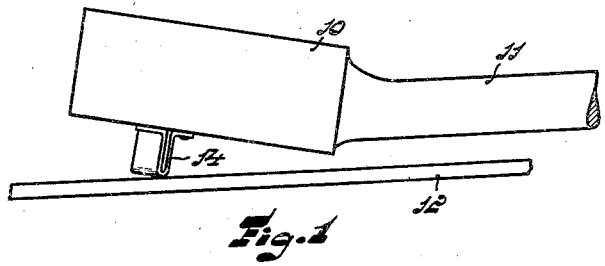
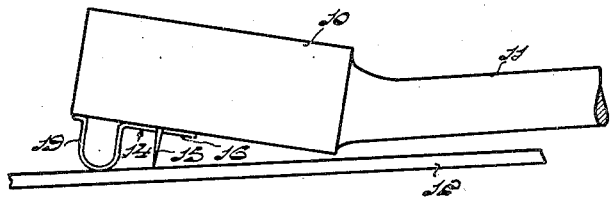
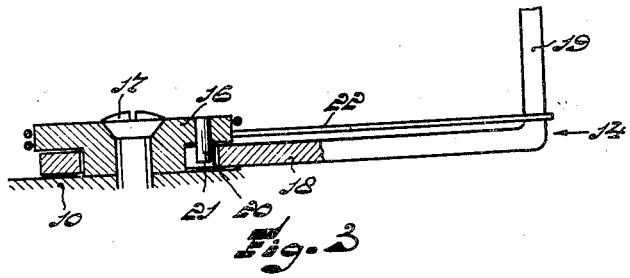
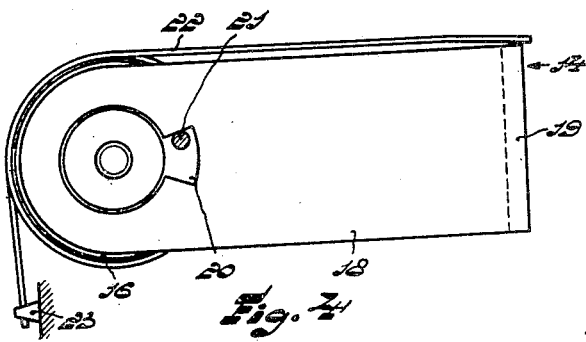

2,496,861

UNITED STATES PATENT OFFICE 2,496,861

PICKUP PROVIDED WITH A MEMBER FOR PROTECTING THE SCANNING NEEDLE

Jan de Boer and Gerrit Schenkel, Eindhoven, Netherlands, assignors, by mesne assignments, to Hartford National Bank and Trust Company, Hartford, Conn., as trustee Application May 9, 1946, Serial No. 668,380
In the Netherlands November 17, 1941

Section 1, Public Law 690, August 8, 1946
Patent expires November 17, 1961

5 Claims. (Cl. 274—25)

It is known to provide pick-ups with a member which, when the pick-up is placed on the phonogram carrier, protects the scanning needle against any rough contact with the surface of the said carrier. By putting the latter into motion this protective member is moved out of the position of protection initially occupied and the scanning needle gradually comes into contact with the phonogram carrier without a greater pressure being exerted during the scanning than the usual pressure of the needle. Such protective means are particularly important with scanning needles which are liable to be damaged such as sapphires and thin tungsten points.

The known protective members consist of a projection which is secured to the needle-side of the pick-up and which, when the latter is placed on the phonogram carrier, comes sooner into contact with the latter than the scanning needle. It is customary to secure this protecting member to the casing of the pick-up so as to be rotatable in such manner that it can rotate in a plane passing through the scanning needle and the direction of travel of the phonogram carrier. During the rotation of this member in the said plane parts with smaller dimensions come between the casing of the pick-up and the phonogram carrier so that the former can gradually move towards the latter.

These protective members are constructionally formed as pins liable to be tilted over or as rotatable and eccentrically journaled rollers.

All these known protective members have, however, the drawback that although they prevent any direct contact between the scanning needle and the phonogram carrier when the pick-up is placed on the latter, they notwithstanding do not protect the scanning needle in general against direct mechanical deterioration when the pick-up is not in operation, for these protective members are separated from the scanning needle.

The invention has for its object to provide a protective member such that it protects the scanning needle itself against undesired contact even when the pick-up is not in operation.

According to the invention, the protective member is provided in such manner that it encloses the scanning needle or at least part thereof and is movable in a plane substantially perpendicular to the scanning needle so that owing to the movement of the phonogram carrier the member is moved out of the position of protection. When the pick-up is taken from the phonogram carrier, an external force, for example that of a spring, restores the protective member to the position of protection.

The invention will be explained more fully with reference to one form of construction given by way of example.

Fig. 1 represents a pick-up comprising a needle-protecting device and placed on a stationary phonogram carrier.

Fig. 2 represents the same pick-up, whose needle-protecting device is brought out of the position of protection by the movement of the phonogram carrier.

Figs. 3 and 4 show constructional details of the protective member.

In Figs. 1 and 2, 10 denotes the casing of a pick-up, which casing is supported in the usual manner by an arm 11. When the pick-up is placed on a phonogram carrier 12 a scanning needle 15, for example a sapphire, is protected from coming into rough contact with this carrier by a protecting member 14 which consists of a strip of material having a portion 19 which is formed so as to enclose the needle as a protecting cap at the point and at two mutually opposite sides.

When the phonogram carrier 12 is put into motion, the ordinary direction of the movement relatively to the pick-up 10 and the arm 11 being that of the arrow 13 the curved portion 19 of the protective member, which portion is in contact with the phonogram carrier, is moved in the direction 13 due to the friction between the carrier 12 and the said curved portion. The member 14 is rotatable about a point 16 which is located aside from the needle 15 at the bottom of the casing 10. The underside of this casing, i. e. the side where is the needle 15, usually encloses an acute angle with the direction of travel 13 of the carrier. When therefore the protective member 14 swings about the point 16 in a plane parallel to the needle side of the casing 10 in the direction of travel of the carrier, the portion 19, which was at first opposite the point of the needle 15, is displaced to a portion of the casing 10 which is farther remote from the phonogram carrier 12, owing to which the distance between the casing 10 and the carrier 12 may be reduced. The needle 15 slowly sinks into the grooves to be scanned of the carrier 12.

Since the direction of the scanning needle is usually substantially perpendicular to the bottom of the casing of the pick-up, the protective member moves in a plane substantially perpendicular to the scanning needle. During the swinging movement of the protective member, the open sides of the curved portion 19 may move past the scanning needle.

The constructional realisation of the protective member is shown in detail in Figs. 3 and 4. Fig. 3 represents to an enlarged scale a section of the point of rotation. With the aid of a screw 17 provided with a countersunk head a rivet 16 is screwed on to the casing 10, the straight portion 18 of the protective member being rotatable about this rivet 16. The movement of this member is limited by a stop in the form of a pin 21 in the rivet, said pin being located in a slit 20 in the straight portion 18.

A spiral spring 22 secured at one of its ends to a tag 23 on the casing 10 and pressing at the other end against the protective member, permanently forces this member to occupy the position of protection around the scanning needle. If consequently the pick-up is taken again from the phonogram carrier, this spring ensures that the position of protection is taken up again so that when the pick-up is not in operation the scanning needle is protected from being damaged by rough contact.

What we claim is:

1. A pick-up for a sound reproducing machine comprising a body portion, means for mounting a needle so that said needle may project from a face of said body portion, and a protector member for a needle which may so project, said protector member being mounted on pivotal means on said face of said body portion offset from said needle mounting means in a direction substantially normal to the direction of movement of a phonogram carrier for pivotal movement in a plane substantially parallel to that of said face, and said pivotal means being located with respect to said mounting means and said protector member being constructed and arranged in order that said protector member may be pivoted to a position for substantially covering a needle mounted in said mounting means for protecting the needle from injurious engagement with an object and away from said position for uncovering the needle.

2. A pick-up for a sound reproducing machine as claimed in claim 1 wherein spring means are mounted on said body portion for biasing said protector member to said position.

3. A pick-up for a sound reproducing machine comprising a body portion, a needle projecting from the bottom face of said body portion, and a protector member mounted on pivotal means on said bottom face of said body portion offset from said needle in a direction substantially normal to the direction of movement of a phonogram carrier for pivotal movement in a plane substantially perpendicular to the main axis of said needle, the dimensions of said protector member and the distance between said needle and said pivotal mounting being constructed and arranged in order that said protector member may pivot to a position to substantially cover said needle for protecting said needle from injurious impact with an object and may pivot away from said position to uncover said needle, and resilient means mounted on said body portion for bringing said protector member to said position.

4. In a sound reproducing apparatus having a pick-up arm and a movable phonogram carrier operatively associated therewith, said pick-up arm having a face thereof which is at an acute angle to said phonogram carrier when said pick-up arm is in operable relationship therewith, means for mounting a needle so that said needle may project from said face for engaging a phonogram on said carrier, and a protector member for a needle which may so project, said protector member being mounted on pivotal means on said face offset from said needle mounting means in a direction substantially normal to the direction of movement of said movable phonogram carrier for pivotal movement in a plane substantially parallel to that of said face, said protector member being located with respect to said mounting means so that said protector member may be pivoted to a position to substantially cover a needle mounted in said mounting means and may be pivoted away from said position to uncover the needle, said pick-up arm being so related to said movable phonogram carrier when in the said operable relationship therewith that said protector member frictionally engages a phonogram on said phonogram carrier, whereby said protector member is moved from said position upon movement of said phonogram, and biasing means on said pick-up arm for urging said protector member towards said position.

5. In a sound reproducing apparatus having a pick-up arm and a movable phonogram carrier operatively associated therewith, said pick-up arm having a face thereof which is at an acute angle to said phonogram carrier when said pick-up arm is in operable relationship therewith, said acute angle diverging in the direction of movement of said movable carrier, a needle projecting from said face for engaging a phonogram on said carrier, and a protector member for said projecting needle, said protector member being mounted on pivotal means on said face offset from said needle in a direction substantially normal to the direction of movement of said movable phonogram carrier for pivotal movement in a plane substantially parallel to that of said face, said protector member being located with respect to said needle so that said protector member may be pivoted to a position to substantially cover said needle and may be pivoted away from said position to uncover said needle, said pick-up arm being so related to said movable phonogram carrier when in the said operable relationship therewith that said protector member frictionally engages a phonogram on said phonogram carrier, and biasing means on said pick-up arm for urging said protector member towards said position whereby said protector member is moved from said position upon movement of said phonogram, and whereby due to the said acute angle between said pick-up arm face and said phonogram carrier, said pick-up arm moves progressively closer to said phonogram carrier due to said protector member moving progressively further away from said needle so that said needle progressively and gently engages a phonogram on said carrier.

JAN DE BOER.
GERRIT SCHENKEL.

REFERENCES CITED

The following references are of record in the file of this patent:

UNITED STATES PATENTS

| Number | Name | Date |
| --- | --- | --- |
| 1,198,127 | Herrman | Sept. 12, 1916 |
| 2,262,503 | Kierulff | Nov. 11, 1941 |
| 2,418,617 | Bessire | Apr. 8, 1947 |